H. CROUCH.
DRILL PULLER.
APPLICATION FILED JULY 19, 1913.
1,117,554.
Patented Nov. 17, 1914.
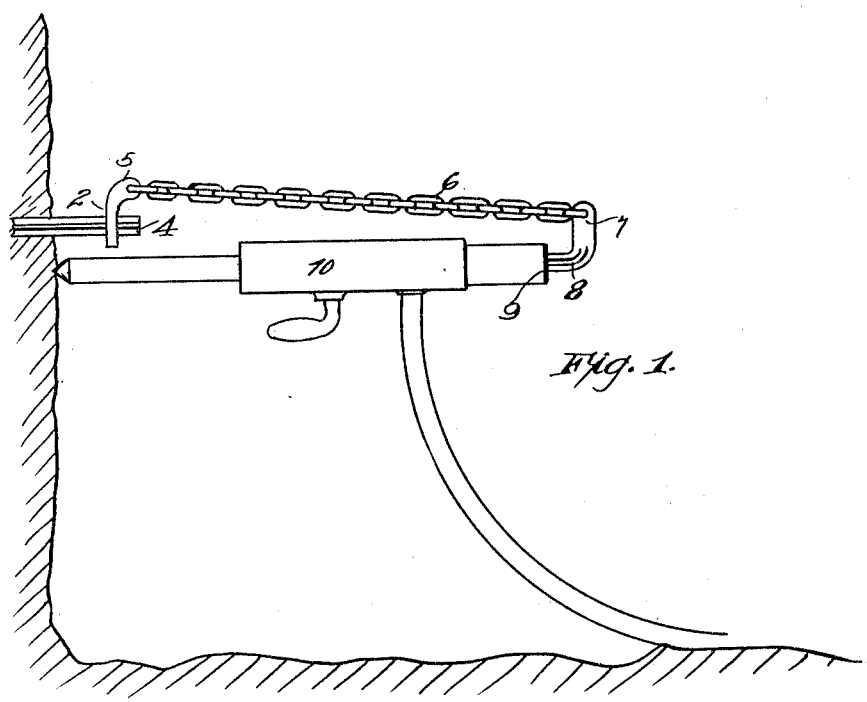
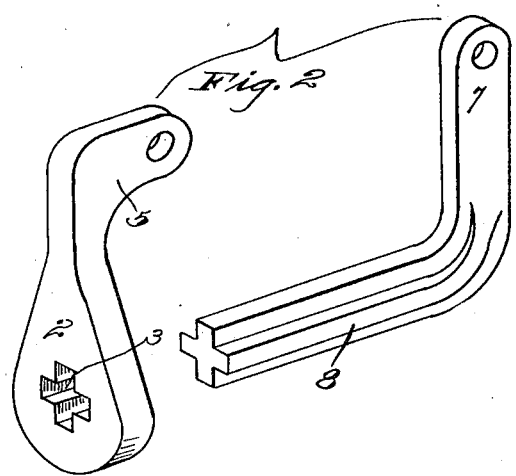
WITNESSES:
F. E. Maynard.
J. H. Herring
INVENTOR
Howison Crouch.
BY G. H. Strong
ATTORNEY

UNITED STATES PATENT OFFICE.

HOWISON CROUCH, OF GRASS VALLEY, CALIFORNIA.

DRILL-PULLER.

1,117,554.      Specification of Letters Patent.      Patented Nov. 17, 1914.

Application filed July 19, 1913. Serial No. 780,089.

*To all whom it may concern:*

Be it known that I, HOWISON CROUCH, a citizen of the United States, residing at Grass Valley, in the county of Nevada and State of California, have invented new and useful Improvements in Drill-Pullers, of which the following is a specification.

This invention relates to drill pullers.

The object of the present invention is to provide a practicable, inexpensive, durable and powerful means for pulling stuck drills from drill holes.

It consists in the provision of an apparatus comprising a member formed to snugly and detachably embrace the shank of the stuck drill, and a part capable of temporary adjustment in the drill-receiving socket of a drilling machine, and connecting the drill clamp and the part adjustable in the drilling machine so that, when the drilling machine is reversed in its relative position so as to abut at one end against the face of the wall in which the drill is stuck and power is applied, the connection between the drill clamp and the part inserted in the drill is placed under tension with sufficient force to extract the stuck drill.

It also comprises details of construction which will be more fully explained by reference to the accompanying drawings, in which—

Figure 1 is a side elevation of the apparatus as used. Fig. 2 is a perspective view of the pulling tackle comprising the drill clamp and the dog adjustable in the drill socket.

In its illustrated form I have shown the drill pulling tackle as comprising a clamp part 2, of suitable proportions and material, which is perforated, as at 3, with an aperture of considerable contour adapted to approximate and slidably fit over a drill shank 4 in the event that the drill becomes firmly embedded or stuck in the drill hole and cannot readily be removed by hand. The upper portion of the drill clamp 2 is shown as bent or formed to produce an eye 5, to which may be attached a tension member 6, here shown as a chain, to the opposite end of which is connected the eye 7 of an angular piece draw-bar 8. The angular draw-bar 8 may be formed up of a piece of drill steel of such cross section as will fit the socket or end 9 of a drilling machine 10, any suitable type of which may be employed.

In operation, after a drill, as 4, has been driven into a rock and in the event that it becomes so firmly embedded as to be immovable by hand, then the operator reverses the drilling machine 10 so that its abutment rests against the wall at a point contiguous to the drill 4. Then by adjusting the clamp 2 of the drill, pulling the tackle over the body of the drill and inserting the bar 8 in the drill socket 9, air is turned into the drilling machine in which the pressure will be exerted to advance the drill so as to take the slack out of the chain 6. As soon as this becomes taut the power of the drilling machine will be exerted in a line substantially parallel with the stuck drill to withdraw the latter from its position in the hole.

I have found by actual construction and use of this instrument that it is reliable, durable and inexpensive, and being light can be readily carried about from position to position in difficult situations in mines and can be quickly adjusted, when necessary, and will do the work required very quickly, thus saving labor and time.

Having thus described my invention, what I claim and desire to secure by Letters Patent is—

An attachment for a hammer rock drill comprising a flexible member provided at one end with means for gripping the shank of a drill steel and at the other end with a bracket arm, the end of which is bent at an angle and adapted to be inserted into the drill socket of the rock drill so that upon supporting the rock drill in reversed position and reciprocating the hammer thereof, the impact of the latter will exert a pulling force upon the drill steel.

In testimony whereof I have hereunto set my hand in the presence of two subscribing witnesses.

HOWISON CROUCH.

Witnesses:
     JOHN SWEENY,
     ALBERT CRASE.

Copies of this patent may be obtained for five cents each, by addressing the "Commissioner of Patents, Washington, D. C."